(12) United States Patent
Kiriaki

(10) Patent No.: US 6,169,429 B1
(45) Date of Patent: Jan. 2, 2001

(54) HDD CHIP SET PARTITIONING

(75) Inventor: Sami Kiriaki, Garland, TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 08/994,714

(22) Filed: Dec. 19, 1997

Related U.S. Application Data

(60) Provisional application No. 60/034,000, filed on Jan. 3, 1997.

(51) Int. Cl.[7] .................................................. G11B 21/02

(52) U.S. Cl. .............................................. 327/104; 360/75

(58) Field of Search ................................... 327/100, 104; 360/31, 32, 39, 46, 48, 51, 53, 97.01, 97.04, 98.01

(56) References Cited

U.S. PATENT DOCUMENTS

| | | | |
|---|---|---|---|
| 4,783,705 | * 11/1988 | Moon et al. | 360/77 |
| 5,396,384 | 3/1995 | Caldeira et al. | 360/98.01 |
| 5,493,454 | * 2/1996 | Ziperovich et al. | 360/45 |
| 5,544,135 | * 8/1996 | Akin, Jr et al. | 369/32 |
| 5,668,679 | * 9/1997 | Swearingen et al. | 360/75 |
| 5,844,426 | * 12/1998 | Sheahan et al. | 326/80 |
| 5,852,524 | * 12/1998 | Glover et al. | 360/51 |
| 5,854,714 | * 12/1998 | Reed et al. | 360/51 |
| 5,854,717 | * 12/1998 | Minuhin | 360/65 |

* cited by examiner

Primary Examiner—My-Trang Nuton
(74) Attorney, Agent, or Firm—W. Daniel Swayze, Jr.; W. James Brady, III; Frederick J. Telecky

(57) ABSTRACT

A read channel circuit includes a digital partition and a analog portion coupled by an ADC. This digital portion and the analog portion are on different chips and the analog portion is positioned on the flex.

1 Claim, 4 Drawing Sheets

HDD CHIP SET PARTITIONING

This application claims priority under 35 USC § 119 (e)(1) of provisional application No. 60/034,000 filed Jan. 3, 1997.

TECHNICAL FIELD OF THE INVENTION

The present invention relates to read channel circuits, and more particularly to the chips that the read channel circuits are formed on.

BACKGROUND OF THE INVENTION

The total number of chips required to implement a hard disk drive system varies but may be 7 chips. These chips may be titled read-channel, servo, preamp, DRAM, Controller, flash memory, DSP. Consolidating the digital CMOS chips together in a single chip (or any form of combination of these chips) allows reduction of total number of chips needed and offers lower cost.

This is shown in FIG. 1 and allows for the DSP, the controller and possibly DRAM and Flash memory in a single chip.

Chip consolidation allows improved performance at the right time with lowest cost.

In order to reduce development time of read-channel circuits and improve testability, the read-channel has been designed digitally. However, this digital design requires a conversion of the necessary signals from analog-to-digital in a forward section of the communication channel (read-channel). However, no matter how soon or how far forward the signal processing becomes digital in the read-channel, the analog front-end remains to be the most critical in terms of development time and performance delivery. As integration in a digital CMOS process is required to achieve cost, time and performance, the analog front-end becomes harder and trickier to implement. Advanced CMOS processes with small feature size require lower supply voltage which will affect the performance of the analog front-end significantly, lower signal-to-noise, lower supply rejection and longer design cycle. Moreover, typical generic CMOS process does not contain capacitors, resistors nor low-threshold devices that are necessary to achieve improved analog performance at lower area. Incorporating any of these electrical elements in a generic CMOS process is generally non-standard and will result in higher cost, longer process development and untransportable design. Therefore the analog front-end in the read channel is one of the most important problems to allow full integration of chip sets. The integration, is affected by higher digital noise, higher noise coupling via substrate, lower data rate, lower supply rejection (no cascade at low supply), and higher process fluctuation.

This integration does not necessarily mean low-cost because the capacitor area is large (Metal/Metal cap), and low performance, i.e. analog front-end will require digital equalization (larger number of taps) to fix the non idealities.

SUMMARY OF THE INVENTION

A new architectural partitioning for chip integration is proposed that allows for low-cost while delivers performance at a much lower risk than previous proposal.

DETAILED DESCRIPTION OF THE INVENTION

Figure 1:
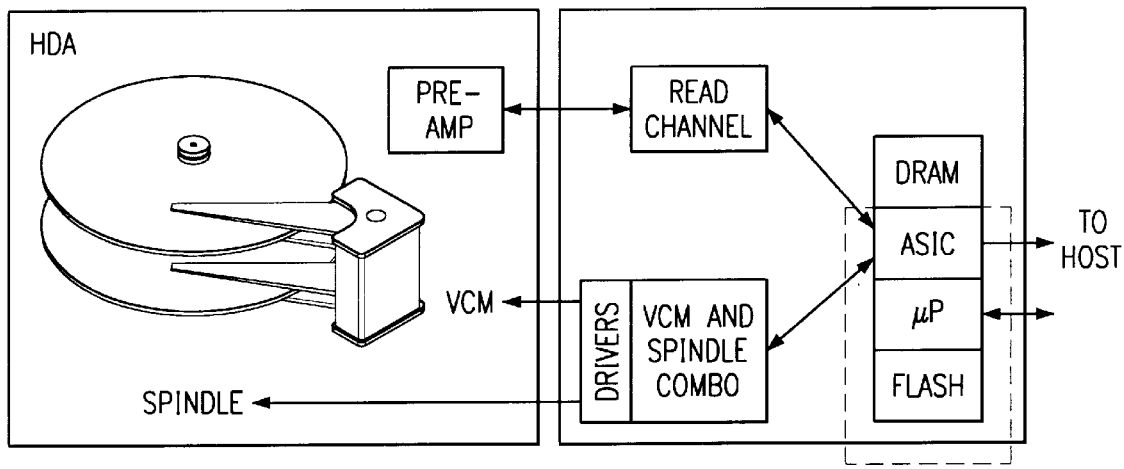
FIG. 1 is circuit diagram of a read-channel circuit.
Figure 2:
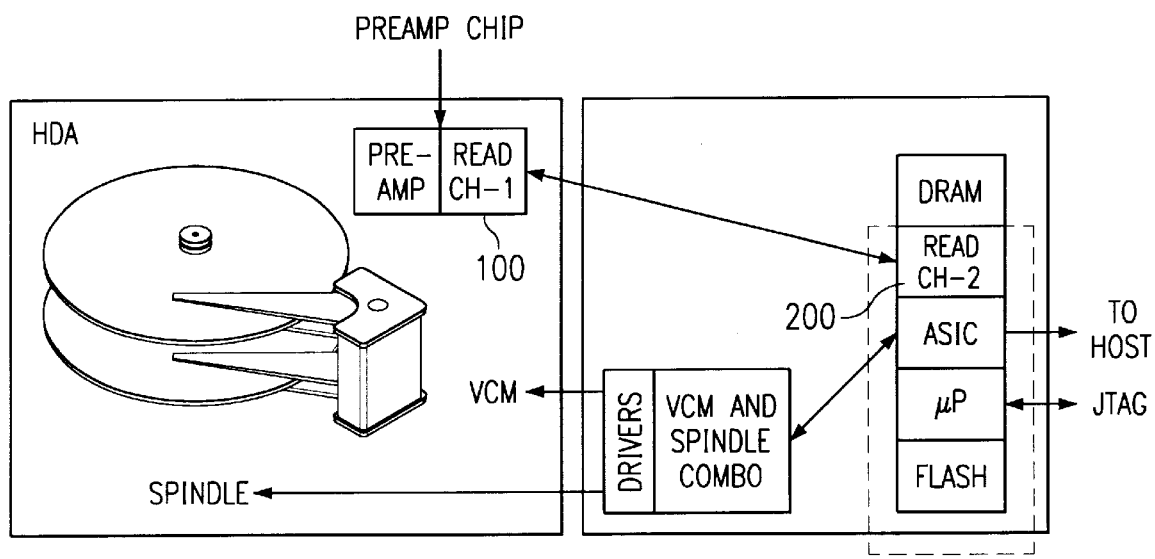
FIG. 2 is an overall circuit diagram.
Figure 3:
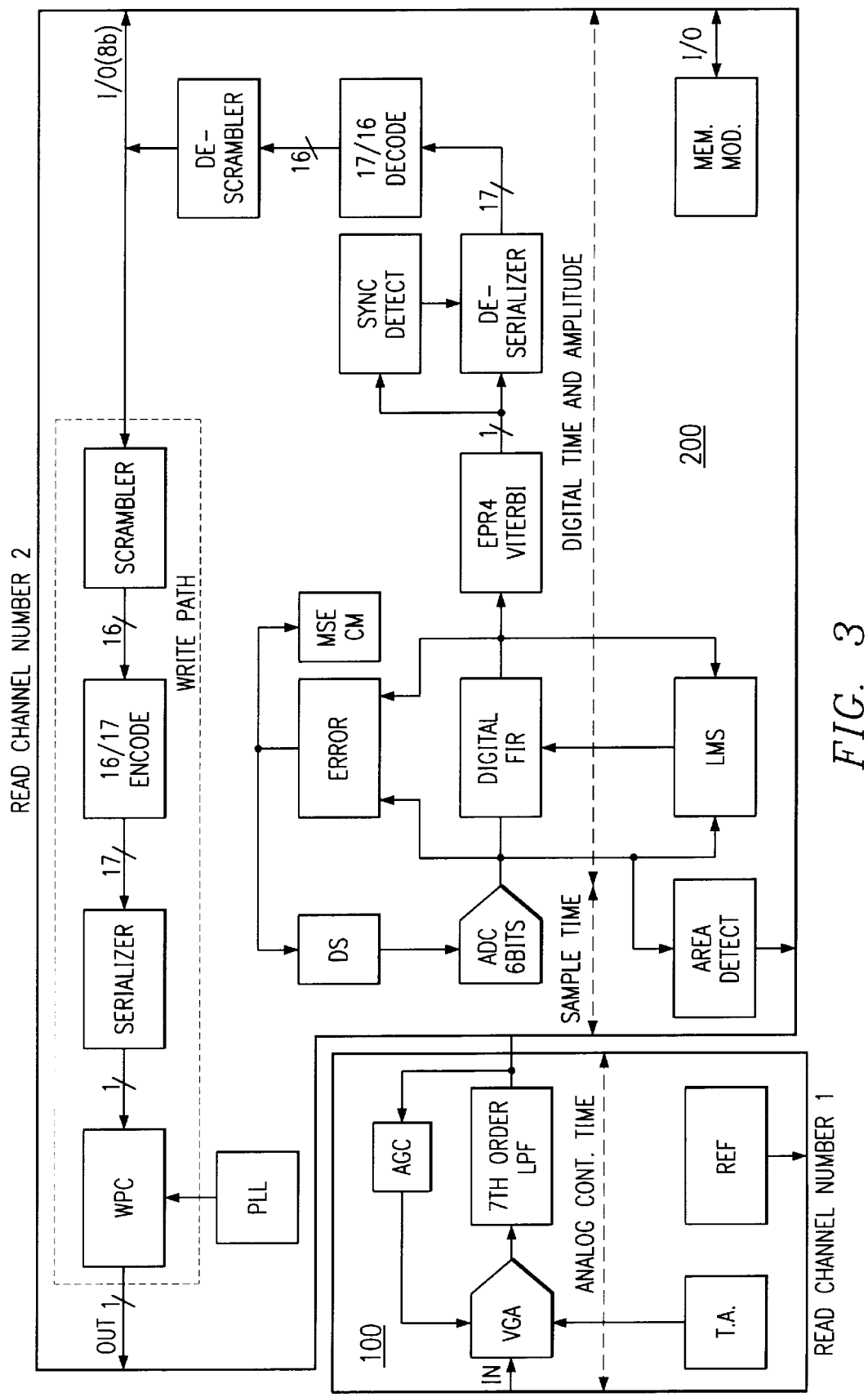
FIG. 3 is proposed partition for a read-channel.

The read-channel may be to be partitioned into two parts. The first part is the analog front-end AGC, VGA, LPF, Ref and may be servo and is referred to as RDCH#1 1 100. While the second part will contain the digital section (FIR CMS, Viterbi detector, SBDT, Decoder, Describe I/O interface, write path, PLC, time base generator) RDCH#2 200. As shown in FIG. 2, the first part, RDCH#1 1 100 will be integrated along the preamp on the flex. This is important where BiCMOS technology is required to deliver noise and speed performance. The addition of RDCH#1 100 to the preamp will not adversely impact the performance of the preamp. In fact, it may reduce the need for external AC-coupling and additional thermal Asperity detection and compensation (used to be in both read-channel and preamp).

Figure 4:
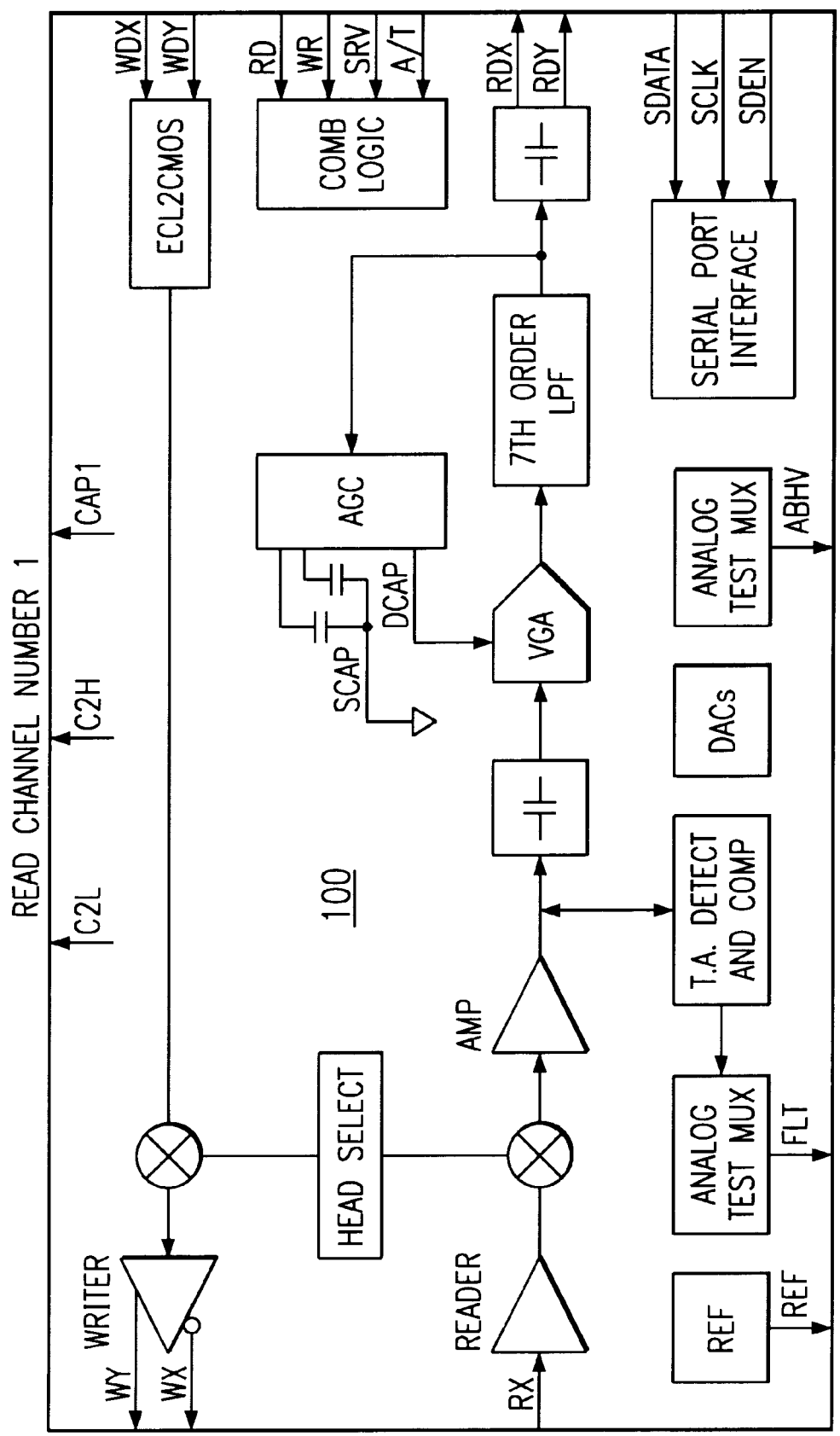
FIG. 4 is a circuit diagram of a analog section of the read-channel.

Also, there will be no additional clocks needed. Programming is achieved via a serial port for example. A conceptual block diagram is shown in FIG. 4.

Figure 5:
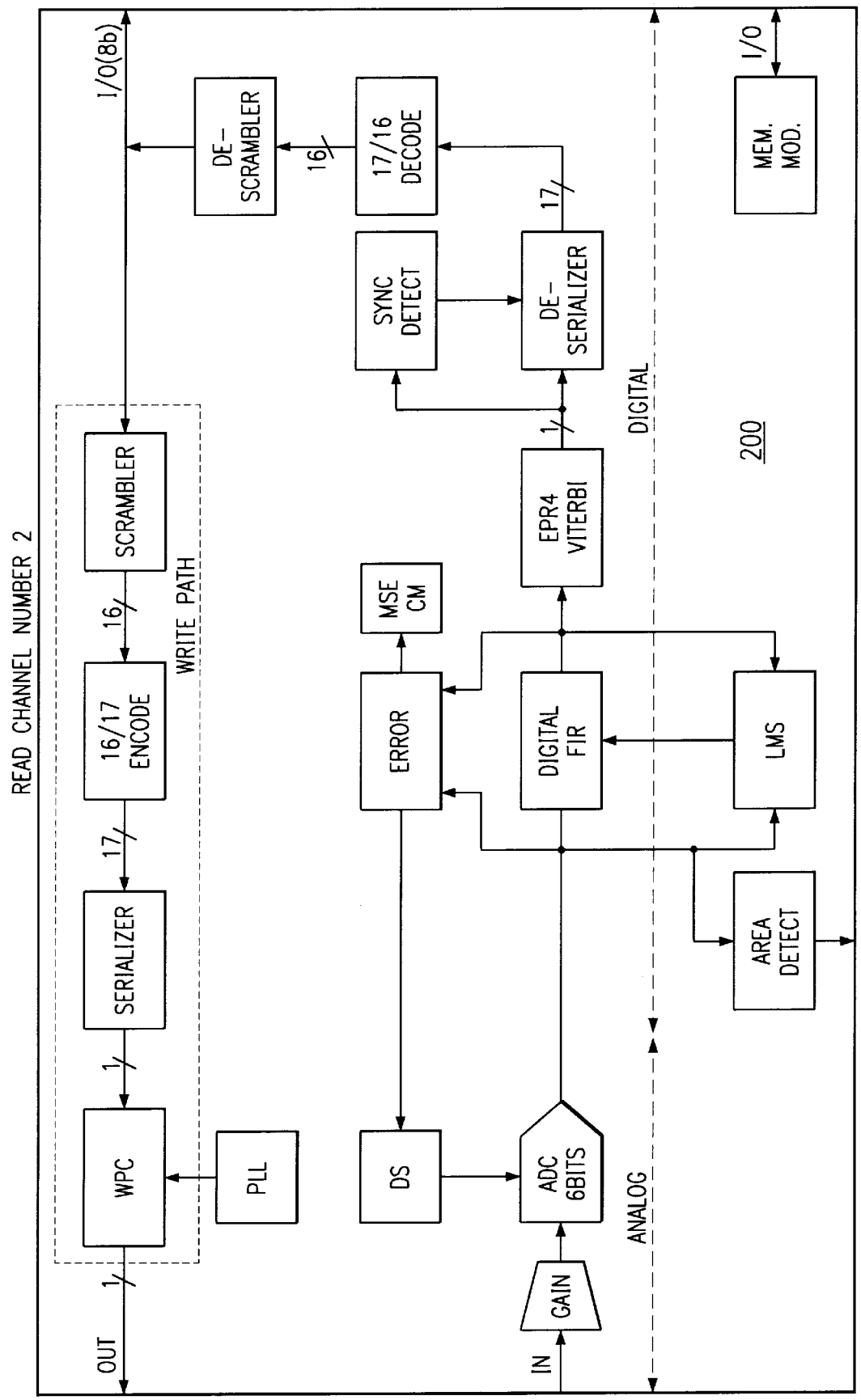
FIG. 5 is a circuit diagram of a digital section of the read-channel.

The second part RDCH#2 200 that is mainly digital in nature is now more adaptable to CMOS standard (or Generic) process. Process improvements will be readily applicable to this part of the read channel. The only analog part of RDCH#2 200 is the Analog-to-Digital convertor (ADC). If this A/D converter would have been placed in RDCH#1 100 then the performance of this circuit will degrade due to switching noise coupling in the most sensitive part of the system, for example the preamp. In this scheme, the ADC will be placed on RDCH#2 200, as shown in FIG. 5, to allow for noise isolation in RDCH#1 100. Also, to reduce power due to not having 6 or 7 interface bits switching at max clock rate. Moreover, this might make the flex design more difficult if ADC is placed in RDCH#1 100.

In this proposal the only problem element is ADC design on board of digital process (Generic). Typical ADC designs do not require large capacitances (Flash ADC) and in some cases no capacitors at all folding ADC. Moreover, the output of ADC does not have to drive large lead at clock max clock rate.

The advantage of current architecture is:

1. Can start design based on current technology by simply partitioning the chip this reduces the design time.
2. ADC is the only analog circuit in the digital partition.
3. No need to develop a special technology.
4. Transfer to new digital technology of the read-channel with little redesign of ADC.
5. True low-cost solution while delivering performance.

What is claimed is:

1. A read channel circuit comprising:
   a digital portion of the read channel circuit;
   a flex;
   an analog portion of the read channel circuit, said analog portion of the read channel circuit being positioned on said flex; and
   an AD converter to connect the digital portion with the analog portion, wherein the analog portion is positioned on a different chip than the digital portion.

* * * * *